(12) United States Patent
Manion et al.

(10) Patent No.: US 9,269,034 B2
(45) Date of Patent: Feb. 23, 2016

(54) ORTHOGONAL ENCODING FOR TAGS

(75) Inventors: Michael Keoni Manion, Cronulla (AU); Christopher John Buntel, Singapore (SG)

(73) Assignee: Empire Technology Development LLC, Wilmington, DE (US)

( * ) Notice: Subject to any disclaimer, the term of this patent is extended or adjusted under 35 U.S.C. 154(b) by 112 days.

(21) Appl. No.: 13/816,574

(22) PCT Filed: Aug. 21, 2012

(86) PCT No.: PCT/US2012/051741
§ 371 (c)(1),
(2), (4) Date: Feb. 12, 2013

(87) PCT Pub. No.: WO2014/031107
PCT Pub. Date: Feb. 27, 2014

(65) Prior Publication Data
US 2014/0191036 A1 Jul. 10, 2014

(51) Int. Cl.
G06K 7/10 (2006.01)
G06K 19/06 (2006.01)
G06K 1/12 (2006.01)
G06K 7/14 (2006.01)

(52) U.S. Cl.
CPC .......... *G06K 19/06037* (2013.01); *G06K 1/123* (2013.01); *G06K 7/1404* (2013.01); *G06K 19/0614* (2013.01)

(58) Field of Classification Search
CPC .............. G06K 19/06037; G06K 2019/06225; G06K 7/14; G06K 19/06046; G06K 19/06056; G06K 7/10851; H01L 2924/0002; H01L 2924/00
USPC ......................................... 235/454
See application file for complete search history.

(56) References Cited

U.S. PATENT DOCUMENTS

| | | | |
|---|---|---|---|
| 4,983,817 A * | 1/1991 | Dolash et al. ............ 235/462.04 |
| 6,340,588 B1 | 1/2002 | Nova et al. |
| 6,381,341 B1 | 4/2002 | Rhoads |
| 6,404,898 B1 | 6/2002 | Rhoads |
| 6,430,302 B2 | 8/2002 | Rhoads |
| 6,519,352 B2 | 2/2003 | Rhoads |
| 6,647,129 B2 | 11/2003 | Rhoads |
| 6,768,808 B2 | 7/2004 | Rhoads |
| 6,881,000 B2 | 4/2005 | Perlman et al. |

(Continued)

FOREIGN PATENT DOCUMENTS

| AU | 2007258332 A1 | 12/2007 |
| AU | 2011220563 A1 | 9/2012 |

(Continued)

OTHER PUBLICATIONS

International Search Report and Written Opinion for PCT/US2012/051741 dated Nov. 28, 2012.

(Continued)

*Primary Examiner* — Thien M Le
*Assistant Examiner* — Tae Kim
(74) *Attorney, Agent, or Firm* — Pepper Hamilton LLP

(57) ABSTRACT

Symbologies for encoding data, as well as methods of encoding and decoding thereof are described. The symbologies may have a plurality of pixels arranged in a plurality of patterns on or in a substrate. Furthermore, each of the plurality of pixels may have one or more optical properties that each provides one or more types of non-interacting data.

24 Claims, 11 Drawing Sheets

(56) References Cited

U.S. PATENT DOCUMENTS

| | | | |
|---|---|---|---|
| 6,920,232 B2 | 7/2005 | Rhoads | |
| 6,922,480 B2 | 7/2005 | Rhoads | |
| 6,944,298 B1 | 9/2005 | Rhoads | |
| 7,054,463 B2 | 5/2006 | Rhoads et al. | |
| 7,162,052 B2 | 1/2007 | Brundage et al. | |
| 7,248,717 B2 | 7/2007 | Rhoads | |
| 7,362,879 B2 | 4/2008 | Evans et al. | |
| 7,403,633 B2 | 7/2008 | Brundage et al. | |
| 7,412,072 B2 | 8/2008 | Sharma et al. | |
| 7,444,000 B2 | 10/2008 | Rhoads | |
| 7,460,726 B2 | 12/2008 | Levy et al. | |
| 7,499,566 B2 | 3/2009 | Rhoads | |
| 7,510,125 B2 | 3/2009 | Look | |
| 7,642,898 B1 | 1/2010 | Malocha et al. | |
| 7,676,059 B2 | 3/2010 | Rhoads | |
| 7,760,906 B2 | 7/2010 | Brundage et al. | |
| 7,773,770 B2 | 8/2010 | Evans et al. | |
| 7,778,442 B2 | 8/2010 | Sharma et al. | |
| 7,970,166 B2 | 6/2011 | Carr et al. | |
| 7,987,094 B2 | 7/2011 | Rhoads | |
| 7,991,182 B2 | 8/2011 | Rhoads | |
| 8,010,632 B2 | 8/2011 | Rhoads | |
| 8,027,506 B2 | 9/2011 | Rhoads | |
| 8,027,510 B2 | 9/2011 | Rhoads | |
| 8,035,711 B2 | 10/2011 | Liu et al. | |
| 8,036,420 B2 | 10/2011 | Evans et al. | |
| 8,059,860 B2 | 11/2011 | Brundage et al. | |
| 8,087,583 B2 | 1/2012 | Hawes | |
| 8,094,877 B2 | 1/2012 | Sharma et al. | |
| 8,144,368 B2 | 3/2012 | Rodriguez et al. | |
| 8,144,924 B2 | 3/2012 | Rhoads | |
| 8,150,032 B2 | 4/2012 | Rhoads | |
| 8,150,096 B2 | 4/2012 | Alattar | |
| 8,151,113 B2 | 4/2012 | Rhoads | |
| 8,155,378 B2 | 4/2012 | Reed et al. | |
| 8,155,582 B2 | 4/2012 | Rhoads et al. | |
| 8,160,304 B2 | 4/2012 | Rhoads et al. | |
| 8,160,968 B2 | 4/2012 | Rhoads | |
| 8,165,341 B2 | 4/2012 | Rhoads | |
| 8,165,342 B2 | 4/2012 | Reed et al. | |
| 8,171,567 B1 | 5/2012 | Fraser et al. | |
| 8,175,329 B2 | 5/2012 | Alattar | |
| 8,180,844 B1 | 5/2012 | Rhoads et al. | |
| 8,181,884 B2 | 5/2012 | Rodriguez | |
| 8,184,849 B2 | 5/2012 | Rhoads | |
| 8,184,851 B2 | 5/2012 | Rhoads | |
| 8,185,967 B2 | 5/2012 | Levy | |
| 8,190,713 B2 | 5/2012 | Rhoads | |
| 8,191,783 B2 * | 6/2012 | Cheon | 235/462.04 |
| 8,194,915 B2 | 6/2012 | Sharma et al. | |
| 8,200,976 B2 | 6/2012 | Rhoads et al. | |
| 8,204,222 B2 | 6/2012 | Rhoads | |
| 8,224,022 B2 | 7/2012 | Levy et al. | |
| 8,230,337 B2 | 7/2012 | Rhoads et al. | |
| 8,243,980 B2 | 8/2012 | Rhoads et al. | |
| 2001/0012377 A1 | 8/2001 | Rhoads | |
| 2002/0114492 A1 | 8/2002 | Rhoads | |
| 2002/0172397 A1 | 11/2002 | Rhoads et al. | |
| 2003/0026451 A1 | 2/2003 | Rhoads | |
| 2003/0033530 A1 | 2/2003 | Sharma et al. | |
| 2003/0035565 A1 | 2/2003 | Rhoads | |
| 2003/0116628 A1 * | 6/2003 | Nakazawa et al. | 235/462.1 |
| 2003/0119059 A1 | 6/2003 | Still et al. | |
| 2003/0174860 A1 | 9/2003 | Rhoads | |
| 2003/0174863 A1 | 9/2003 | Brundage et al. | |
| 2003/0194578 A1 * | 10/2003 | Tam et al. | 428/690 |
| 2004/0076746 A1 | 4/2004 | Perlman et al. | |
| 2005/0254684 A1 | 11/2005 | Rhoads | |
| 2005/0286736 A1 | 12/2005 | Rhoads | |
| 2006/0062386 A1 | 3/2006 | Rhoads | |
| 2006/0186348 A1 | 8/2006 | Nguyen et al. | |
| 2007/0047766 A1 | 3/2007 | Rhoads | |
| 2007/0110274 A1 | 5/2007 | Brundage et al. | |
| 2007/0201835 A1 | 8/2007 | Rhoads | |
| 2007/0223592 A1 | 9/2007 | Rhoads | |
| 2007/0286453 A1 | 12/2007 | Evans et al. | |
| 2008/0019560 A1 | 1/2008 | Rhoads | |
| 2008/0035730 A1 * | 2/2008 | Look | 235/462.07 |
| 2008/0131083 A1 | 6/2008 | Rhoads | |
| 2008/0131084 A1 | 6/2008 | Rhoads | |
| 2008/0196059 A1 | 8/2008 | Evans et al. | |
| 2009/0132547 A1 | 5/2009 | Rhoads | |
| 2009/0180665 A1 | 7/2009 | Brundage et al. | |
| 2009/0232352 A1 | 9/2009 | Carr et al. | |
| 2009/0290043 A1 | 11/2009 | Liu et al. | |
| 2010/0067734 A1 | 3/2010 | Rhoads | |
| 2010/0102250 A1 * | 4/2010 | Li et al. | 250/459.1 |
| 2010/0149393 A1 | 6/2010 | Zarnowski et al. | |
| 2010/0284564 A1 | 11/2010 | Brundage et al. | |
| 2010/0318664 A1 | 12/2010 | Rhoads | |
| 2011/0007936 A1 | 1/2011 | Rhoads | |
| 2011/0046959 A1 | 2/2011 | Evans et al. | |
| 2011/0081041 A1 | 4/2011 | Sharma et al. | |
| 2011/0205384 A1 | 8/2011 | Zarnowski et al. | |
| 2013/0140431 A1 * | 6/2013 | Yves | 250/206 |

FOREIGN PATENT DOCUMENTS

| | | | | |
|---|---|---|---|---|
| AU | 2011220758 A1 | 9/2012 | | |
| CA | 2654085 A1 | 12/2007 | | |
| CA | 2790714 A1 | 9/2011 | | |
| CA | 2790853 A1 | 9/2011 | | |
| CN | 101467161 A | 6/2009 | | |
| DE | 10149463 A1 | 4/2003 | | |
| EP | 0987855 A2 | 3/2000 | | |
| EP | 1500521 A2 | 1/2005 | | |
| EP | 2027561 A2 | 2/2009 | | |
| JP | 2007202163 A | 8/2007 | | |
| JP | 2009540468 A | 11/2009 | | |
| KR | 20090018811 A | 2/2009 | | |
| KR | 2001044743 A | * | 5/2011 | G06K 7/10 |
| MX | 2008015959 A | 3/2009 | | |
| RU | 2009100923 A | 7/2010 | | |
| TW | 201215164 A | 4/2012 | | |
| TW | 201215165 A | 4/2012 | | |
| WO | WO 95/14289 A2 | 5/1995 | | |
| WO | WO 95/14289 A3 | 5/1995 | | |
| WO | WO 96/36163 A2 | 11/1996 | | |
| WO | WO 97/43736 A1 | 11/1997 | | |
| WO | WO2007/016374 A2 | 2/2007 | | |
| WO | WO2007/146303 A2 | 12/2007 | | |
| WO | WO2007/146303 A3 | 12/2007 | | |
| WO | WO2011/106461 A1 | 9/2011 | | |
| WO | WO2011/106568 A1 | 9/2011 | | |
| ZA | 200810452 A | 11/2009 | | |

OTHER PUBLICATIONS

Bizarri et al., On $BaMgAi_{10}O_{17}$:$Eu^{2+}$phosphor degradation mechanism: thermal treatment effects, *Journal of Luminescence* (Jun. 2005), 113(3-4):199-213 (Abstract).

Denso Wave Incorporated, http://www.qrcode.com/en/vertab;e4.html (Printed from Internet Jan. 2, 2013).

Gold Book Alphabetical Index, http://goldbook.iupac.org/B00682.html (Aug. 19, 2012).

Katsumata et al., Characteristics of Strontium Aluminate Crystals Used for Long-Duration Phosphors, *Journal of American Ceramic Society* (Jan. 20, 2005), 81(2):413-416 (Abstract).

Luminofory Presentation, http://tubedevices.com/alek/pwl/luminofory/luminofory.ppt.(Dec. 16, 2006) (Machine translation attached).

Ntwaeaborwa et al., Degradation of $Y_2O_3$:Eu phosphor powders, *Physica Status Solidi (c)* (Jul. 21, 2004), 1(9):2366-2371 (Abstract).

Orthogonal frequency-division multiplexing, http://en.wikipedia.org/wiki/Orthogonal_frequency-division_multiplexing (Printed from Internet Jan. 2, 2013).

Sebastian et al., Degradation of zinc sulfide phosphors under electron bombardment, *Journal of Vacuum Science & Technology A: Vacuum, Surface and Films* (May 1996), 14(3):1697:1703 (Abstract).

(56) References Cited

OTHER PUBLICATIONS

Tanno et al., Lifetime Improvement of $BaMgAl_{10}O_{17}$: $Eu^{2+}$ Phosphor by Hydrogen Plasma Treatment, *Jpn. J. Appl. Phys.* (Sep. 24, 2009), 48:092303-092306 (Abstract).

Wang et al., Deep Traps and Mechanism of Brightness Degradation in Mn-doped ZnS Thin-Film Electroluminescent Devices Grown by Metal-Organic Chemical Vapor Deposition, *Jpn. J. Appl. Phys.* (Feb. 3, 1997), 36:2728-2732 (Abstract).

* cited by examiner

FIG. 10

EXPOSURE 1
t=1

| LEVEL | DIMENSION | PIXEL 1 CODE | PIXEL 2 CODE | PIXEL 3 CODE |
|---|---|---|---|---|
| 11 | PIXEL 1ST EDGE PHOSPHORESCENCE INTENSITY | B | 2 | C |
| 12 | PIXEL 2ND EDGE PHOSPHORESCENCE INTENSITY | D | D | C |
| 13 | PHOSPHORESCENCE INTENSITY GRADIENT | - | D | A |
| 14 | PHOSPHORESCENECE INTENSITY GRADIENT SHAPE | 2 | B | C |

| LEVEL | DIMENSION | PIXEL 1 CODE | PIXEL 2 CODE | PIXEL 3 CODE |
|---|---|---|---|---|
| 15 | PHOSPHORESCENCE DECAY RATE 1ST EDGE | B | A | 1 |
| 16 | PHOSPHORESCENCE DECAY RATE 2ND EDGE | A | C | B |
| 17 | PHOSPHORESCENCE DECAY RATE GRADIENT | 2 | 4 | 1 |
| 18 | PHOSPHORESCENCE DECAY RATE SHAPE | B | A | - |

| LEVEL | DIMENSION | PIXEL 1 CODE | PIXEL 2 CODE | PIXEL 3 CODE |
|---|---|---|---|---|
| 19 | PHOSPHORESCENCE PHOTOBLEACHING RATE 1ST EDGE | B | 3 | 4 |
| 20 | PHOSPHORESCENCE PHOTOBLEACHING RATE 2ND EDGE | 4 | 3 | - |
| 21 | PHOSPHORESCENCE PHOTOBLEACHING RATE GRADIENT | B | - | D |
| 22 | PHOSPHORESCENCE PHOTOBLEACHING RATE SHAPE | C | D | A |

100 US 9,269,034 B2

ORTHOGONAL ENCODING FOR TAGS

CROSS-REFERENCE TO RELATED APPLICATION

This application is a U.S. national stage filing under 35 U.S.C. §371 of International Application No. PCT/US2012/051471, filed Aug. 21, 2012 and entitled "Orthogonal Encoding for Tags," the disclosure of which is incorporated by reference in its entirety.

BACKGROUND

Symbologies, such as matrix codes and the like, are becoming increasingly common for use in tagging and tracking solutions. Reading devices, such as barcode scanners and smartphone apps that use a camera to view and decode the symbology are common and easy to obtain. Most reading devices are capable of viewing and decoding a wide variety of symbologies, such as, for example, one-dimensional barcodes and many two-dimensional matrix code technologies. However, the symbologies are currently limited in the amount of data they are capable of encoding (e.g., a v.40 QR code with error correction level L can encode 4,296 alphanumeric characters).

Because of an increasingly common need to encode more data on a symbology, several new technologies have modified the symbologies in ways that allow for additional data to be encoded. However, some of these technologies still fail to encode enough data, and some of these technologies also require proprietary reading devices that may be expensive and/or difficult to obtain.

SUMMARY

In an embodiment, a symbology for encoding data is disclosed. The symbology may have a plurality of pixels arranged in a plurality of patterns on a substrate, wherein each of the plurality of pixels has one or more optical properties that each provides one or more types of non-interacting data.

In an embodiment, a method of encoding a symbology is disclosed. The method may include arranging a plurality of pixels on a substrate in a plurality of patterns to form a machine-readable code, wherein each of the plurality of pixels has one or more optical properties that each provide one or more types of non-interacting data.

In an embodiment, a method of decoding a symbology, made up of a plurality of pixels, is disclosed. This may include reading a shape of the plurality of pixels by an optical reading apparatus to obtain a first type of non-interacting data, reading a size of the plurality of pixels by the optical reading apparatus to obtain a second type of non-interacting data, reading a one or more optical properties of each of the plurality of pixels by the optical reading apparatus to obtain a third type of non-interacting data, combining the first type of non-interacting data, the second type of non-interacting data and the third type of non-interacting data by a processing device, and decoding the combination by the processing device.

In an embodiment, a method of decoding a symbology, made up of a plurality of pixels, is disclosed. This may include reading a shape and a size of the plurality of pixels by an optical reading apparatus to obtain a first type of non-interacting data, reading a one or more optical properties of each of the plurality of pixels by the optical reading apparatus to obtain a second type of non-interacting data, combining the first type of non-interacting data and the second type of non-interacting data by a processing device, and decoding the combination by the processing device.

In an embodiment, an article of manufacture comprising a symbology for encoding data is disclosed, wherein the symbology may have a plurality of pixels arranged in a plurality of patterns on a substrate, and wherein each of the plurality of pixels comprises one or more optical properties that each provides one or more types of non-interacting data.

BRIEF DESCRIPTION OF THE DRAWINGS

FIG. 10 depicts a reference table for encoding 22 different types of data according to an embodiment.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

Figure 1:
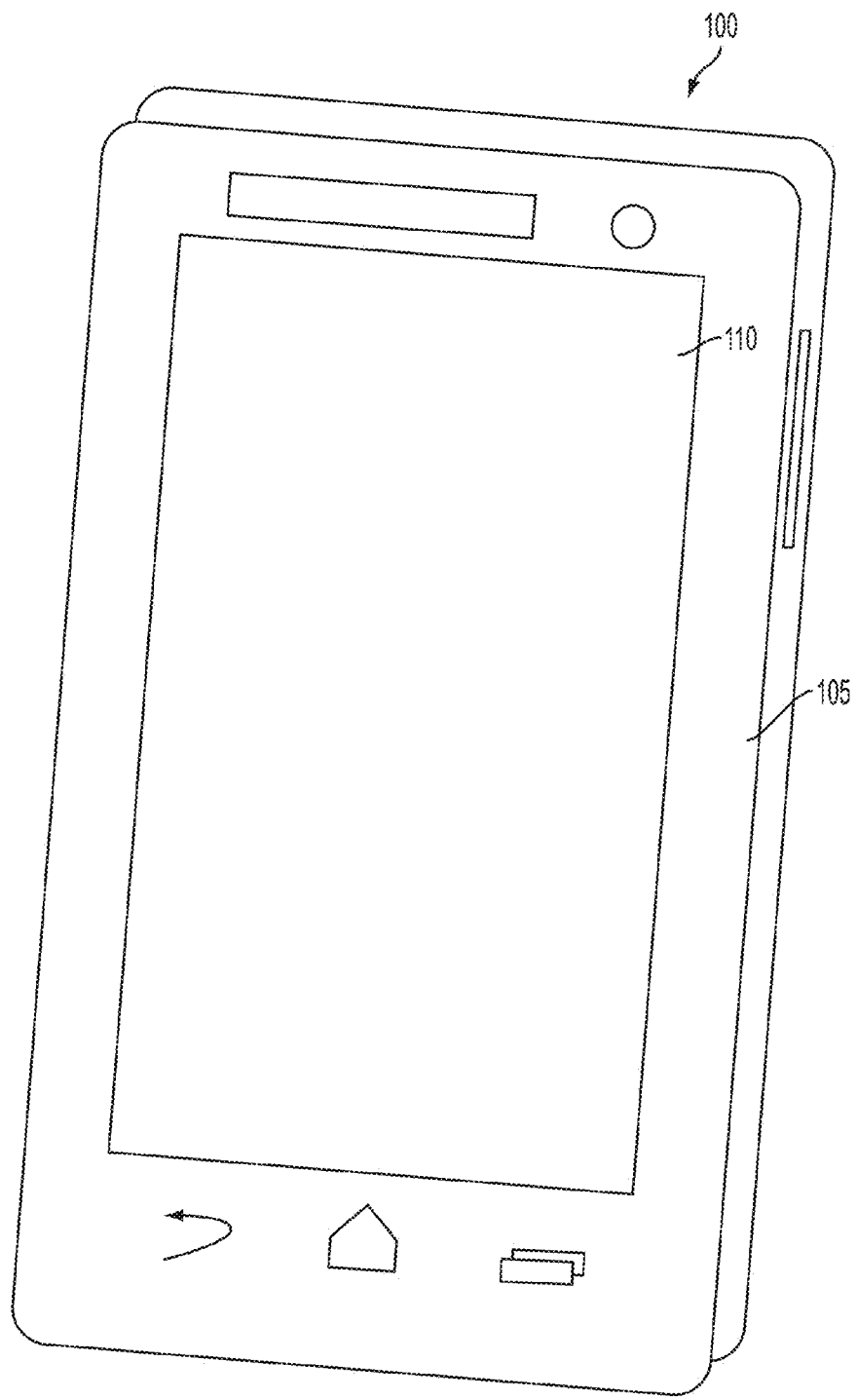
FIG. 1 depicts a front face of an optical reading apparatus according to an embodiment.
Figure 2:
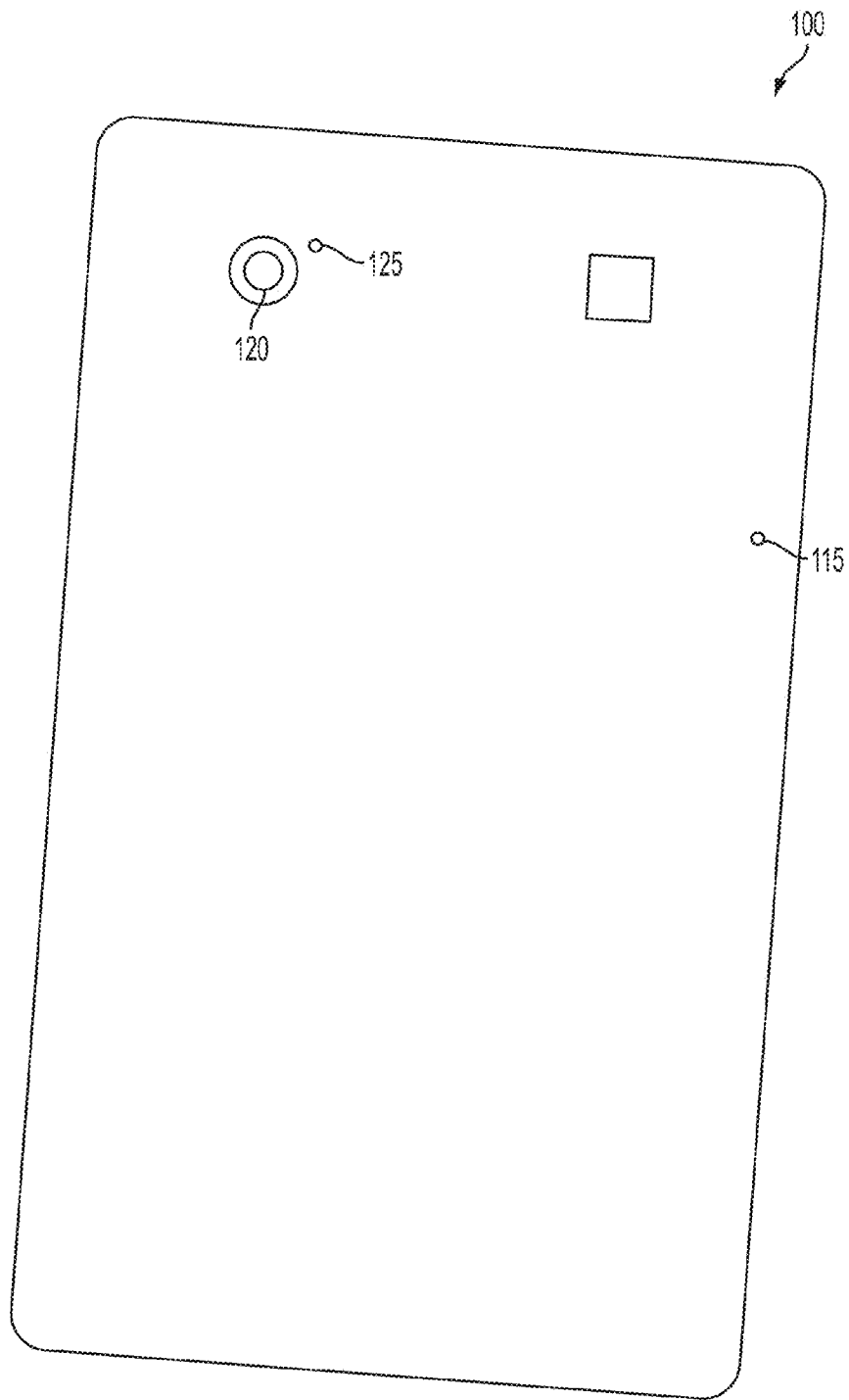
FIG. 2 depicts a rear face of the optical reading apparatus of FIG. 1.

An "optical reading apparatus" refers to a device that can generally be used to read and decode a symbology as disclosed herein. The optical reading apparatus may have an imaging device such as a camera, as well as an illumination device such as a flash. The optical reading apparatus may further have a computing device, which may be a processor, a memory, and/or the like. The computing device may be integrated as a component of the optical reading apparatus or may be in operable communication with the optical reading apparatus via communications ports. The optical reading apparatus may further have a display capable of displaying information decoded from the symbology. The display may be integrated as a component of the optical reading apparatus or may be in operable communication with the optical reading apparatus via communications ports. Examples of optical reading apparatuses may include, but are not limited to, personal computers, gaming systems, televisions, and portable electronic devices such as a smartphones, personal digital assistants, cameras, tablet computers, laptop computers, GPS navigation devices, media players, handheld scanners, fixed scanners, and the like. One such example of an optical reading apparatus is depicted in FIGS. 1 and 2.

A "symbology" is a pattern, a symbol, an image or the like, as well as portions and combinations thereof, that is displayed on or in a substrate and provides an optical, machine-readable encoded representation of data. The symbology may be made up of a plurality of pixels arranged in any manner to create varying shapes, patterns, layers and the like without limitation. Symbologies may include, without limitation, one-dimensional barcodes, two-dimensional (2D) barcodes, or three-dimensional barcodes. Examples of two-dimensional barcodes include data matrix codes, quick response codes, Aztec codes, Maxi codes and the like. Symbologies may also include letters, numbers, punctuation and other symbols. The symbologies may be displayed on a display and may be of any geometric shape or size. In this document, the terms "barcode" or "matrix code" may be used in the examples, but the term is intended to include any type of symbology.

Furthermore, a "luminescent symbology" refers to a symbology that exhibits or has the potential to exhibit luminescent properties. The luminescent properties may be exhibited on a portion of the symbology, may be exhibited on the entire symbology, may be layered over other elements of the symbology or may be exhibited in a location proximate to the symbology.

A "pixel" is a single element of a symbology that is capable of being read by the optical reading apparatus. For example, in instances where the symbology is a one-dimensional barcode, such as in FIG. 3B, each horizontal line of the barcode may be referred to as a pixel. Alternatively, as shown in FIG. 3C, portions of each horizontal line may be referred to as a pixel, wherein each portion of the line is different from other portions, as described in greater detail herein. Similarly, in an example of a two-dimensional barcode, such as the QR code depicted in FIG. 3A, each individual square unit within the QR code may be referred to as a pixel.

"Non-interacting data" is a type of data that is generally orthogonal to another type of data. Thus, each type of data may be obtained through the use of different detection modalities that may each be non-interacting or otherwise independent of each other so that they do not interfere with each other or the ability to read each type of data independently of the other types of data. Each type of data may be encoded into various dimensions of each pixel, as described in greater detail in Example 1.

FIG. 1 depicts a first surface 105 of an optical reading apparatus, generally designated 100, according to an embodiment. The first surface 105 may have a display 110. The display 110 may generally be any device that is capable of displaying a digital image, video, text and/or the like. Examples of such devices include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The optical reading apparatus 100 and/or the display 110 may further include a user interface such as a keypad, one or more switches or buttons, and/or a touch sensitive screen including, but not limited to, a resistive touchscreen, a capacitive touchscreen, or an infrared touchscreen.

FIG. 2 depicts a second surface 115 of the optical reading apparatus 100. The second surface 115 may have an imaging device 120 and an illumination device 125. The imaging device 120 may be any suitable component capable of receiving an optical image and transmitting the image information to other components of the optical reading apparatus 100 for processing. The imaging device 120 may further have a plurality of filters that may block certain wavelengths of light from entering the imaging device. The imaging device 120 may further have an ability to adjust its focal length and aperture in such a manner that would allow it to zoom and properly focus upon an intended object to be imaged. Such ability may be through mechanical components (such as an optical zoom) or programming (such as a digital zoom). This adjustment may define an "optimal focal distance," or a range of distances in which the optical reading apparatus 100 may be properly positioned from the intended object to be imaged to achieve a clear image.

While the imaging device 120 is depicted on the second surface 115 of the optical reading apparatus 100 in FIG. 2, persons skilled in the art will appreciate that the imaging device 120 may be positioned at any location upon any face of the optical reading apparatus 100, or may even be external to the optical reading apparatus 100 and connected by any means of electronic communication, including, but not limited to, physical cable communication such as universal serial bus (USB), wireless radio communication, wireless light communication, or near field communication technology.

The illumination device 125 may be used in any light conditions to complete any of the tasks described herein. Additionally, the illumination device 125 may be independently activated to turn on or off at specific points in time, such as when additional lighting is necessary to capture an ideal image or when illumination is necessary to change the properties of the symbology. Other features of the illumination device 125 may include dimming/brightening, strobe, constant on, illumination at certain wavelengths, illumination at a range of wavelengths and/or the like.

The illumination device 125 may contain any suitable light source capable of providing illumination including, but not limited to, magnesium-based flashes, xenon-based flashes, fulminate-containing flashes, light-emitting diode (LED) flashes, and the like. While the present figure depicts the illumination device 125 as being integrated with the optical reading apparatus 100, it may be appreciated that the illumination device 125 may be a separate component in operable communication with the optical reading apparatus 100, such as USB based flashes, hot shoe based flashes, remote slave flash units or other similar devices.

Figures 3A, 3B:
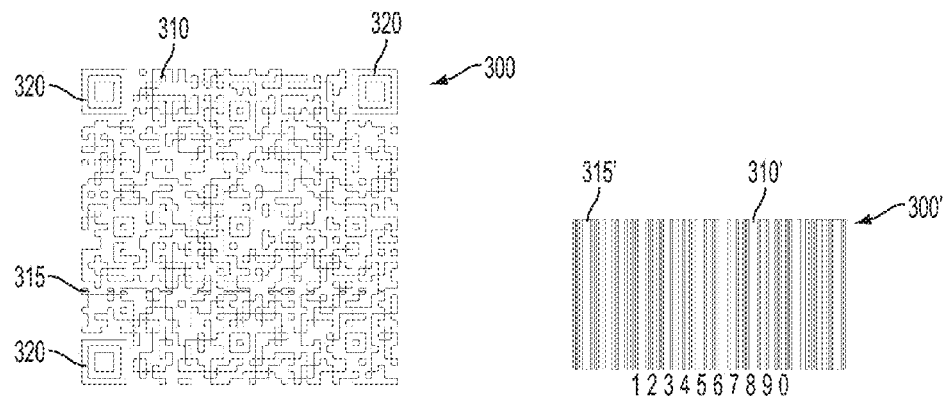
FIGS. 3A-3C depict examples of symbologies according to various embodiments.
Figure 3C:
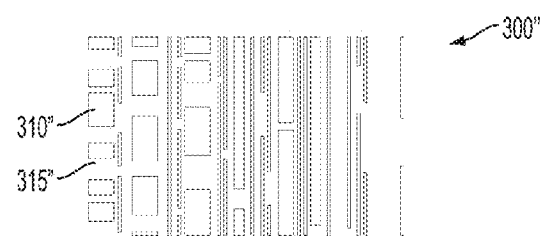

FIGS. 3A, 3B and 3C each depict a symbology, generally designated 300, in accordance with one or more embodiments. The symbology 300 may be, for example, a luminescent symbology, and may include a plurality of shaded pixels 305, a plurality of voided pixels 310, and a plurality of positioning elements 320. While the symbology 300 depicted in FIG. 3A is square, those skilled in the art will recognize that a variety of shapes and sizes may be used for the symbology 300 without departing from the scope of the present disclosure. For example, a rectangular shaped symbology as shown in FIGS. 3B and 3C may be used. Furthermore, the symbology 300 may incorporate additional elements, such as, for example, text, images and/or the like. The text, images and/or the like may be present as individual pixels or may be a neutral portion of the symbology. Furthermore, the symbology itself may be incorporated within the additional elements (i.e., part of a picture, text and/or the like).

As shown in the symbology 300" of FIG. 3C, each shaded pixel 310" and each voided pixel 315" may, for example, be read in a horizontal direction to obtain first data and in a vertical direction to obtain second data. Furthermore, pixels may be voided and/or shaded for encoding additional data with the use of phosphors, luminescent inks, fluorescent inks and/or the like. Thus, the symbology 300" in FIG. 3C may actually appear more like the symbology 300' in FIG. 3B when marked with a non-luminescent marking material, and then may evolve into the symbology 300" of FIG. 3C when the luminescent ink applied on top of or beneath the non-luminescent marking material is activated to produce additional levels of encoded data, as provided in greater detail herein.

Referring to FIG. 3A, the symbology 300 may be deposited on a surface of a substrate with one or more marking materials. Examples of marking materials may include, but are not limited to, toner, graphite-based marking materials, alcohol-based marking materials, wax-based marking materials, inks such as carbon-based inks, soy-based inks, metallic inks and the like. The marking materials may further contain any number of solvents, dyes, pigments, resins, lubricants, solubilizers, surfactants, particulate matter, doping agents, activators, fluorescent materials, phosphors and the like, as well as combinations thereof.

Deposition of the marking materials onto the substrate may be achieved by any method now known or later developed. Examples of deposition methods include printing, laser etching, selective bleaching, physical interaction, stamping, and/or the like. Furthermore, in instances where a plurality of marking materials may be used, a marking material may be positioned alongside another marking material or may be layered over at least a portion of another marking material.

The substrate may be any substrate including, but not limited to, paper products, metals, polymers, consumer goods, apparel, computer components, storage devices, sanitation components or automobiles. The substrate may further be integrated with materials having distinct degradation or quenching properties, such as, but not limited to, oxidation properties, reduction properties, electron bombardment properties, reaction properties with water molecules or thermal effects properties.

In an embodiment, one such marking material for use in depositing the symbology on a substrate may be a phosphorescent ink containing a phosphor that is derived from zinc sulfide, strontium aluminate, or combinations thereof. In other embodiments, only a portion of the marking materials used for depositing the symbology may be phosphorescent ink. Accordingly, another portion of the marking materials used for depositing the symbology may be one or more non-phosphorescent inks. In certain embodiments, the symbology 300 may be deposited on a surface of a substrate with a zinc sulfide-derived phosphorescent ink. In other embodiments, the phosphorescent ink may be capable of emitting a plurality of frequencies of light, wherein each frequency is correlated with a particular crystal structure. The crystal structure may be altered via photonic means, thermal means or an electron beam. The phosphorescent ink may further have a plurality of additives. Examples of such additives may include, but are not limited to doping agents, activators, fluorescent materials, and/or the like. The additives may provide the phosphorescent ink with a capability to produce light having various color properties, decay properties, photobleaching properties, degradation properties, luminance properties, intensity properties, fluorescence resonance energy transfer properties, gradient properties and/or the like.

The phosphorescent ink may further be combined with a fluorescent material that is excited at the same wavelength as a wavelength that is emitted by the phosphor. In these embodiments, the resulting combination may contain fluorescence resonance energy transfer (FRET) properties. Furthermore, the frequencies and intensities of ambient light may not change the response of the combination. Thus, a symbology incorporating a phosphorescent ink with a fluorescent material may be read and decoded an infinite number of times, with or without a flash, and the encoded data contained therein will not change. However, the same symbology may contain filters to provide an emission of only specific wavelengths of either excitation or emission in only certain portions or elements of the symbology.

The phosphorescent ink may further be excitable, thus causing the phosphorescent ink to exhibit luminescent properties. Excitation of the phosphorescent ink may be achieved by exposure of the ink to an illuminant, such as, for example, the illumination device 125 (FIG. 2). Repeated excitation of the phosphorescent ink may cause a decay in the luminescent properties of the phosphorescent ink over a period of time or a number of excitations. In embodiments where the symbology 300 comprises a plurality of different phosphorescent inks, each of the plurality of phosphorescent inks may have a different rate of decay. Thus, repeated excitation of the plurality of phosphorescent inks may cause a portion of the phosphorescent inks to decay faster than others. This may allow for an even greater amount of data to be encoded, such as additional types of data, as described in more detail herein.

In certain embodiments, the phosphorescent ink may exhibit a luminance upon excitation by exposure to the illuminant. Repeated excitation of the phosphorescent ink may cause a decay in the exhibited luminance over a period of time or a number of excitations. In embodiments where the symbology 300 comprises a plurality of different phosphorescent inks, each of the plurality of phosphorescent inks may exhibit a different rate of decay. Thus, repeated excitation of the plurality of phosphorescent inks may cause a portion of the phosphorescent inks to decay faster than others, illuminate at differing wavelengths and/or photobleach. This may allow for an even greater amount of data to be encoded, such as additional types of data, as described in more detail herein.

In an embodiment, another marking material may be a fluorescent ink, such as inks that contain organic substances that may fluoresce upon exposure to ultraviolet light. One example of a fluorescent ink may be an ink containing a fluorophore or other fluorescent chemical compound that can re-emit light upon excitation. The fluorescent ink may further contain a photobleaching property, thus allowing for photochemical destruction of the fluorophore after an excitation, such as exposure to the illumination device, as described in more detail herein.

The symbology 300 may generally be encoded by encoding methods now known or later developed. More specifically, data in the symbology 300 may be encoded via the relative positions of the shaded pixels 305 and the voided pixels 310. Furthermore, the symbology 300 may incorporate one or more encoding schemes now known or later developed to use error detection and correction techniques. Use of the error detection and correction techniques may improve reading reliability and may further enable reading of partially damaged symbologies.

Each shaded pixel 305 and each voided pixel 310 may, independently of other pixels, have one or more optical properties, such as, for example, a color property, a shape property, a dimensional property, a relational property, a luminance property, a decay property, an intensity property, a photobleaching property, a degradation property, a fluorescence resonance energy transfer property, a gradient property and/or the like, as discussed in greater detail herein.

Each shaded pixel 305 and each voided pixel 310 may be any shape and/or size, may be deposited with any type of marking material and may have one or more layers, which may optionally be irrespective of other shaded and/or voided pixels in the symbology. The shape of each pixel is not limited by this disclosure, and may be any geometric shape. Furthermore, each pixel may be composed of a plurality of different shapes. In instances where different shapes are used, the shapes may overlap each other, may interlock with each other, or may not intersect with each other. Shapes may overlap based upon colors, gradients, use of phosphorescent inks, and/or the like. Examples of shapes that may be used may include a polygon, an annulus, an arbelos, a circle, a circular segment, an ellipse, a lemniscate, a lune, an oval, a salinon, a semicircle, a tomoe, a magatama, a triquetra, an asteroid, a deltoid, an Archimedean spiral and/or the like. Polygons may be simple or complex, and simple polygons may include convex polygons, concave polygons, equilateral polygons, rectangular convex polygons, cyclic polygons and equiangular polygons. Each shape may encode a type of data. Furthermore, the size and/or the dimensions of each shape may encode another type of data. Also, the positioning of each shape within each pixel may also be used to encode a type of data.

Each shaded pixel 305 and each voided pixel 310 may further have a length, a width and/or other dimensions. The dimensions of each pixel may vary, and thus may be independent of dimensions of other pixels. The varying dimensions of each pixel may provide additional types of encoded data, where the data corresponds to the specific dimensions of each pixel.

The symbology 300 and/or each pixel within the symbology may further have a plurality of optical properties, wherein each optical property may provide encoding information for a distinct type of data. Examples of optical properties may include, but are not limited to, the shape, size, horizontal dimensions, vertical dimensions, luminance, photobleaching properties, decay rate, and/or use of gradients, as well as combinations thereof. The symbology 300 and/or each pixel may include additional or alternate optical properties for encoding additional types of data not specifically recited herein without departing from the scope of this disclosure.

Figure 4:
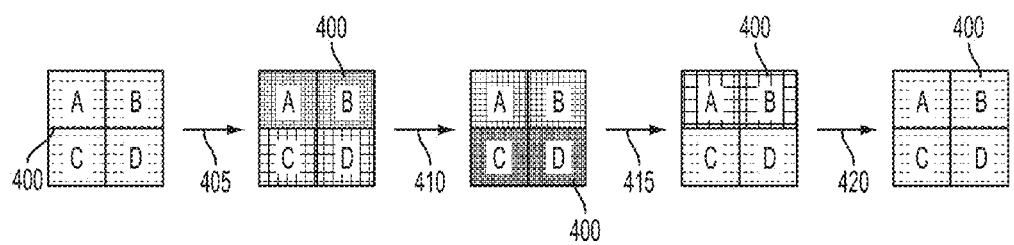
FIG. 4 depicts an example of decay properties of a plurality of pixels according to an embodiment.

As previously described herein, the symbology 300 may be deposited on a substrate with a plurality of inks, such as, for example, luminescent inks, non-luminescent inks and/or the like. Each of the luminescent inks may have a corresponding decay rate, and the decay rates between luminescent inks may vary. FIG. 4 depicts an example of a symbology 400 having 4 shaded pixels A, B, C, D. One or more of the shaded pixels may be marked with a luminescent ink having a differing decay rate. In the present example, shaded pixels A and B may be shaded with a first luminescent ink, and shaded pixels C and D may be shaded with a second luminescent ink. Initially, all 4 shaded pixels A, B, C, D may exhibit an identical luminance. However, upon the occurrence of a first excitation event 405, such as exposure to the illumination device, the luminance of each of the 4 shaded pixels A, B, C, D may begin to decay at a different rate. For example, as shown in FIG. 4, the luminance of shaded pixels A and B does not decay as quickly as the luminance of shaded pixels C and D. As such, shaded pixels A and B exhibit a greater luminance than shaded pixels C and D. As a result, the symbology 400 has been altered and may be encoded with additional information, such as, for example, additional types of data, at this altered state, as well as at future altered states, such as, for example, altered states that are derivatives of previous altered states. The symbology 400 may then undergo additional excitation events 410, 415, 420, such as additional exposure to the illumination device or the passage of time, to change the luminance of the 4 shaded pixels again. Each time, the symbology 400 is altered and the alteration may be encoded with additional information, such as additional types of data. Each type of data may be a derivative of the previous type of data from the previous alteration.

Figure 5:
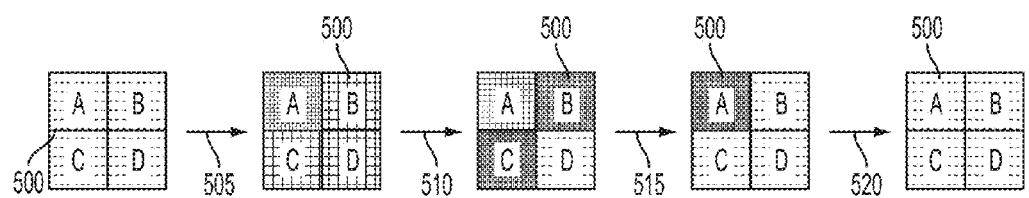
FIG. 5 depicts an example of decay properties of a plurality of pixels according to another embodiment.

Similar to the above example, FIG. 5 depicts an example of a symbology 500 having 4 shaded pixels A, B, C, D, wherein each of the shaded pixels A, B, C, D may have a luminescent ink with a differing decay rate. In the present example, shaded pixel A may be shaded with a first luminescent ink, shaded pixel B may be shaded with a second luminescent ink, shaded pixel C may be shaded with a third luminescent ink, and shaded pixel D may be shaded with a fourth luminescent ink. Initially, all 4 shaded pixels A, B, C, D may exhibit an identical luminance. However, upon the occurrence of a first excitation event 505, such as, for example, exposure to the illumination device, each of the 4 shaded pixels A, B, C, D may begin to decay at a different rate. Thus, the luminances of shaded pixels A, B, C, D exhibit differing intensities after the first excitation event. As a result, the symbology 500 has been altered and may be encoded with additional information, such as additional types of data, at this altered state. The symbology 500 may then undergo additional excitation events 510, 515, 520, such as additional exposure to the illumination device or the passage of time, to change the luminance of the 4 shaded pixels again. Each time, the symbology 500 is altered and may be encoded with additional information, such as additional types of data.

While the examples presented herein with respect to FIGS. 4 and 5 discuss a change in luminance, those skilled in the art will recognize that other properties of each pixel or a portion thereof may also be altered in a similar manner, such as, for example, intensity, phosphor decay, photobleaching properties and/or the like.

Figure 6:
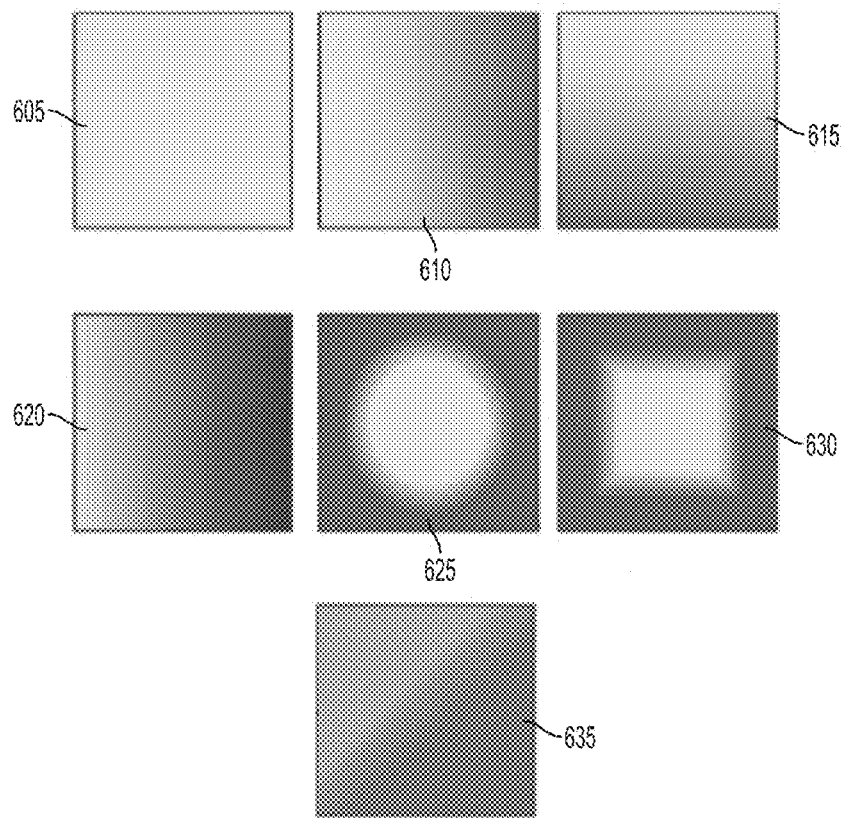
FIG. 6 depicts several examples of gradient properties exhibited by pixels according to various embodiments.

In each of the examples presented above in FIGS. 4 and 5, the ink used to encode each shaded pixel A, B, C, D may have shading that is solid and uniformly dispersed throughout each shaded pixel A, B, C, D. However, as depicted in FIG. 6, an alternative to a solid and uniformly dispersed shading 605, gradients may also be used for each shaded pixel. Examples of possible gradients may include, but are not limited to, horizontal two-color gradients 610, vertical two-color gradients 615, horizontal three-color gradients 620, circular two-color gradients 625, square two-color gradients 630, and diagonal two-color gradients 635. Furthermore, in addition to color gradients, gradients may be used for differing phosphor decay rates, differing luminescent inks, differing intensities, differing photobleaching and/or the like for each pixel. Gradients may further exist with more than two colors, luminances, decay rates, intensities, photobleaching properties and/or the like without departing from the scope of this disclosure.

Figure 7:
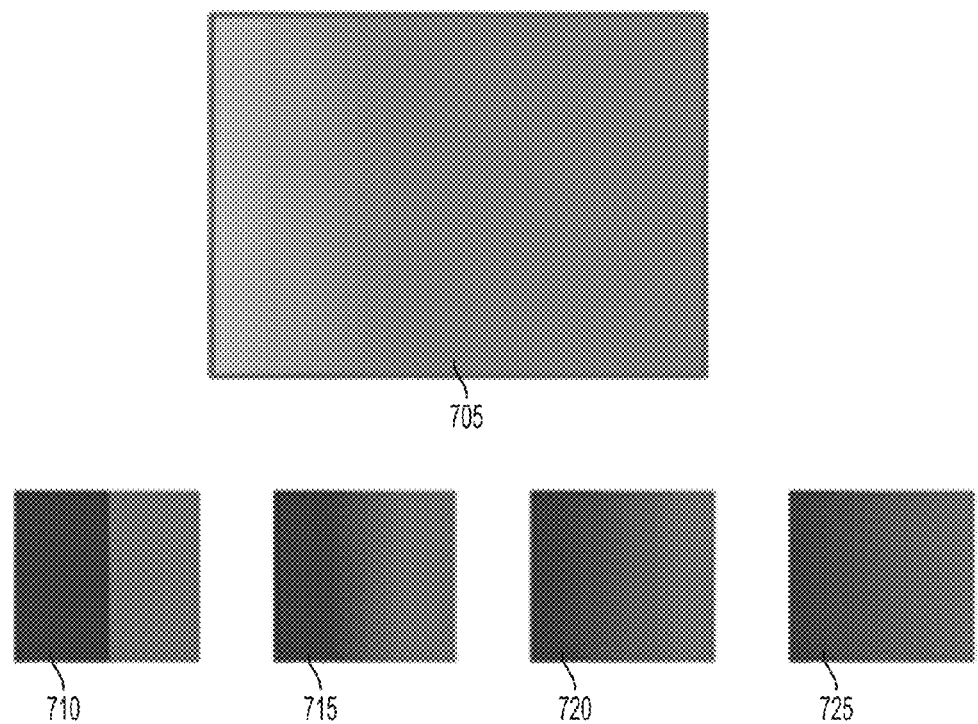
FIG. 7 depicts other examples of gradient properties exhibited by pixels according to various embodiments.

While the gradients depicted in FIG. 6 are evenly dispersed across the shaded pixel, uneven dispersions may also be possible, as depicted in FIG. 7. For example, a horizontal two-color gradient may be dispersed at a 10:90 ratio 705, wherein a first color comprises 10% of the shaded pixel and a second color comprises the remaining 90% of the shaded pixel. Other examples may include a solid 50:50 gradient 710, where the two colors, phosphors, intensities and/or the like are evenly distributed at 50% of the pixel. In addition to the solid 50:50 gradient 710, other 50:50 gradients may vary the slope of the gradient, as shown in 715, 720 and 725, but still disperse each of the two colors, phosophors, intensities and/or the like at 50% of the pixel. In each variation of the slope, an additional type of data may be encoded. Each type of data may be a derivative of the previous type of data from the previous variation of the slope.

Figure 8:
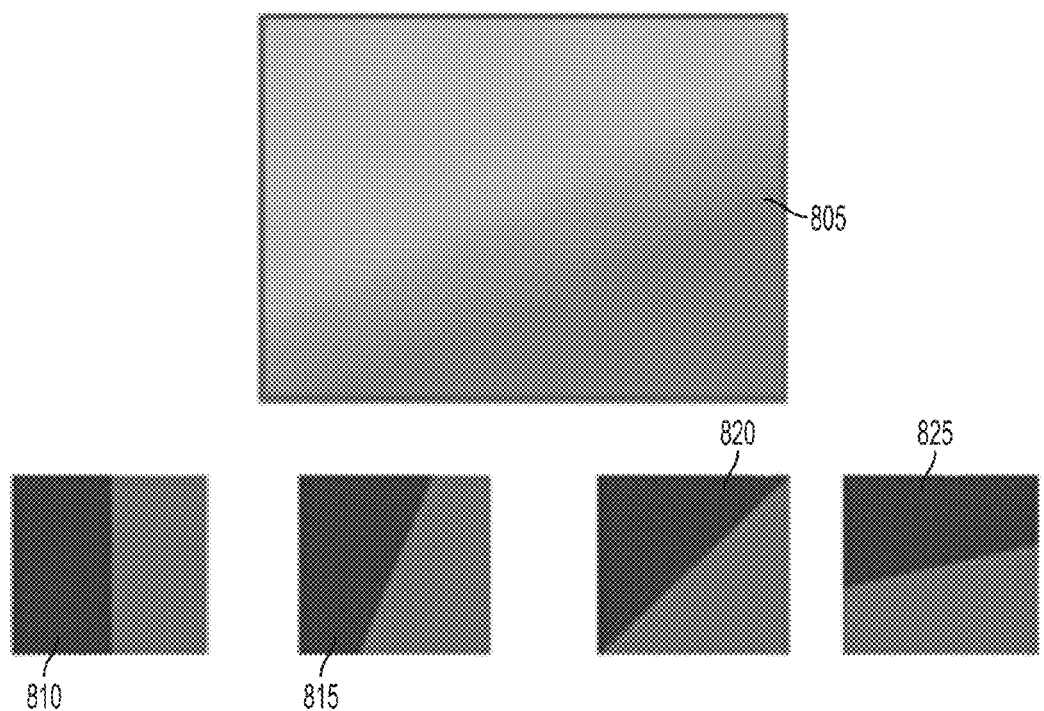
FIG. 8 depicts other examples of gradient properties exhibited by pixels according to various embodiments.

In another example, as shown in FIG. 8, a diagonal gradient may be dispersed at a 60 degree angle 805, but may still remain a 50:50 gradient where the first color, intensity, luminance, decay, photobleaching property and/or the like comprises 50% of the pixel, similar to that of the second color, intensity, luminance, decay, photobleaching property and/or the like. The examples depicted in FIGS. 6-8 are merely illustrative, and thus additional or alternate gradients not specifically shown are intended to be encompassed by this disclosure. The angle may be varied while the 50:50 gradient remains, as shown in 810, 815, 820 and 825. In each variation of the angle of the gradient, an additional type of data may be encoded.

By further providing each shaded pixel with a gradient instead of a uniformly solid color, additional types of data may be encoded, based upon the gradient of each pixel. The gradient of each pixel may be recorded either similarly or differently for each type of marking material used, as well as a gradient for each property displayed by a marking material. For example, a marking material having a luminance, a decay rate and a photobleaching property may use a different gradient for each property, such as the luminance having a horizontal two-color gradient, the decay rate having a circular two-color gradient and the photobleaching property having a vertical two-color gradient. Those skilled in the art will recognize other combinations of gradients that may be used for each marking material and/or property displayed.

Gradients may be encoded with additional types of data in a number of different ways. For example, data may be encoded into each color present in a gradient of a particular pixel, as well as the relative amounts of each color present in the gradient of the particular pixel. Data may also be encoded into each pixel based on the direction of the gradient and the like.

Figure 9:
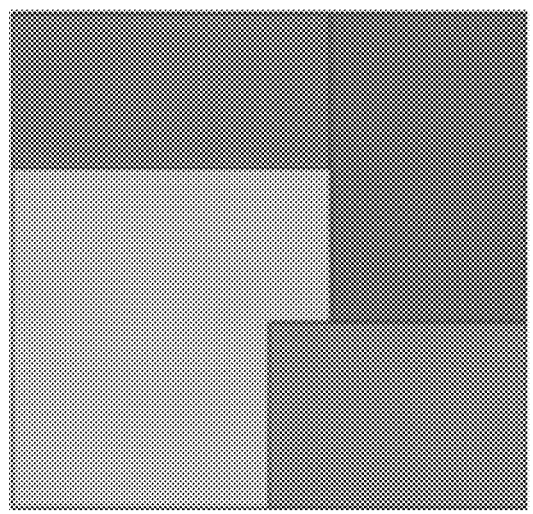
FIG. 9 depicts a pixel exhibiting multiple properties according to various embodiments.

While two colors, phosphors, intensities, photobleaching properties and/or the like are generally used in each pixel as shown the figures presented above, those skilled in the art will recognize that more than two colors, phosphors, intensities, photobleaching properties and/or the like can be used in each pixel without departing from the scope of this disclosure. Thus, for example, a pixel may contain 4 colors, phosphors, intensities, photobleaching properties and/or the like, as depicted in FIG. 9.

Thus, each of the plurality of optical properties may be used to encode a corresponding plurality of types of data. The plurality of types of data encoded by each of the plurality of optical properties may each be orthogonal. Thus, each type of data may be obtained through the use of different detection modalities that may each be non-interacting, or otherwise independent of each other so that they do not interfere with each other. For example, a QR code may be written to encode a first type of data via methods known in the art, thereby appearing as a plurality of black, white and/or colored pixels that are readable by a common optical reading apparatus. Within each of the plurality of pixels, additional information may be encoded through the use of one or more of the plurality of optical properties. For example, each of the plurality of pixels may include different fluorescent materials and/or phosphorescent inks, wherein each may have different emission intensities and/or decay rates. The optical properties and the data encoded therein may be revealed through an excitation, such as by use of the illumination device. Thus, each of the varying types of encoded data may be read independently of each other, and without one interfering with an ability to read another.

EXAMPLES

Example 1

Encoding Pixels with Information Based on Shape, Size and Color

Figure 10:
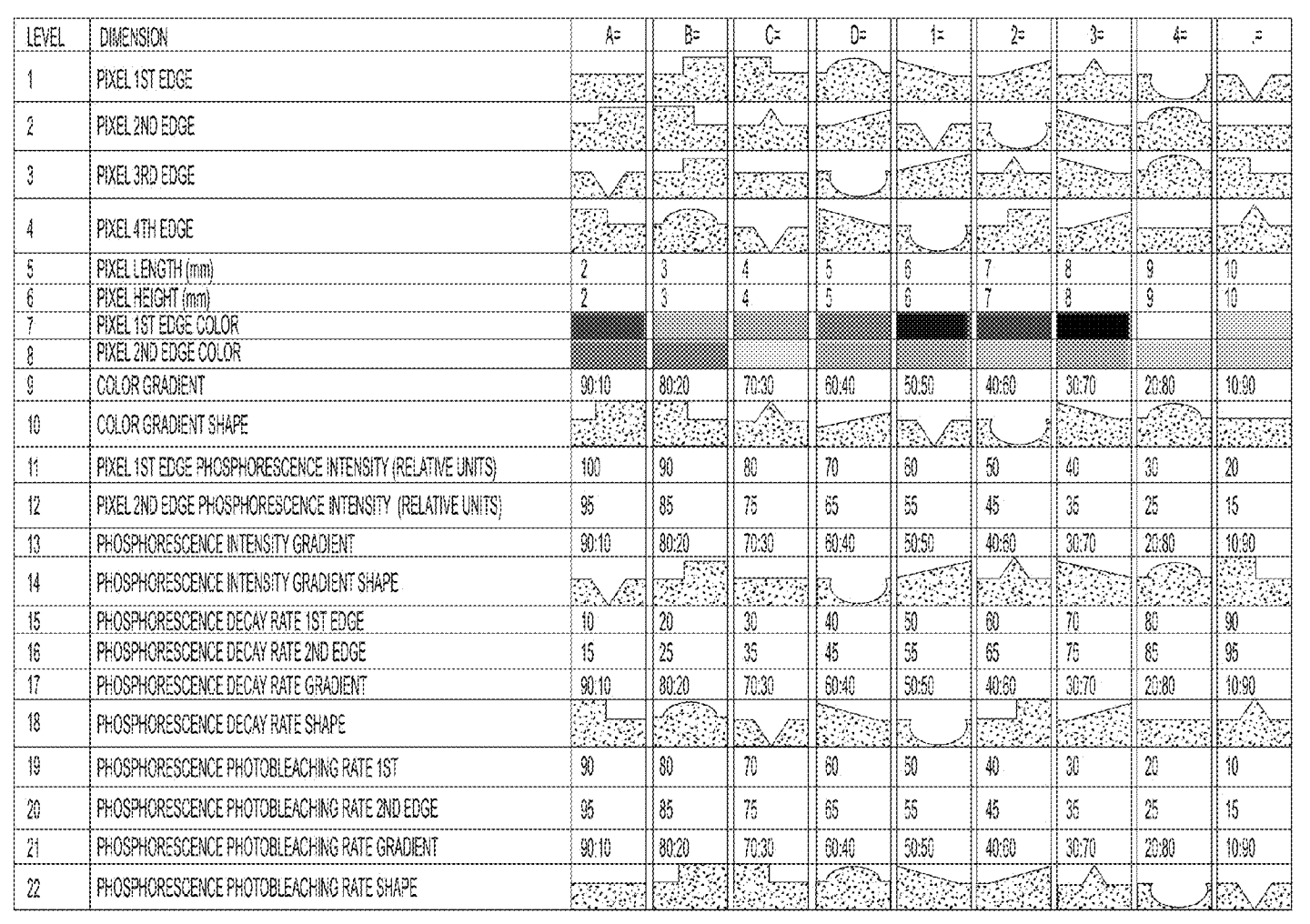
Figure 12:
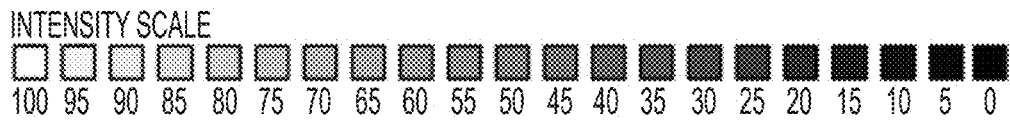
FIG. 12 depicts a diagram and a table for identifying 4 of the 22 different types of data from FIG. 10 to be encoded in a pixel according to an embodiment.
Figure 12:
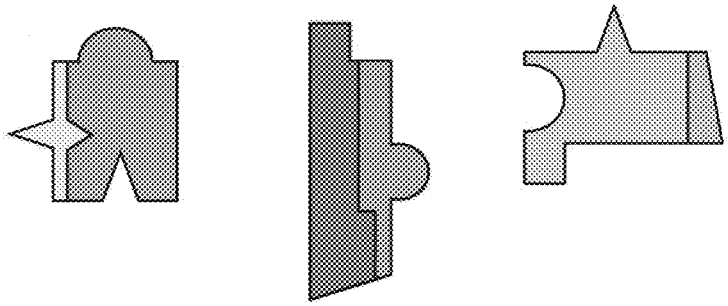
Figure 13:
FIG. 13 depicts a diagram and a table for identifying 4 of the 22 different types of data from FIG. 10 to be encoded in a pixel according to an embodiment.
Figure 13:
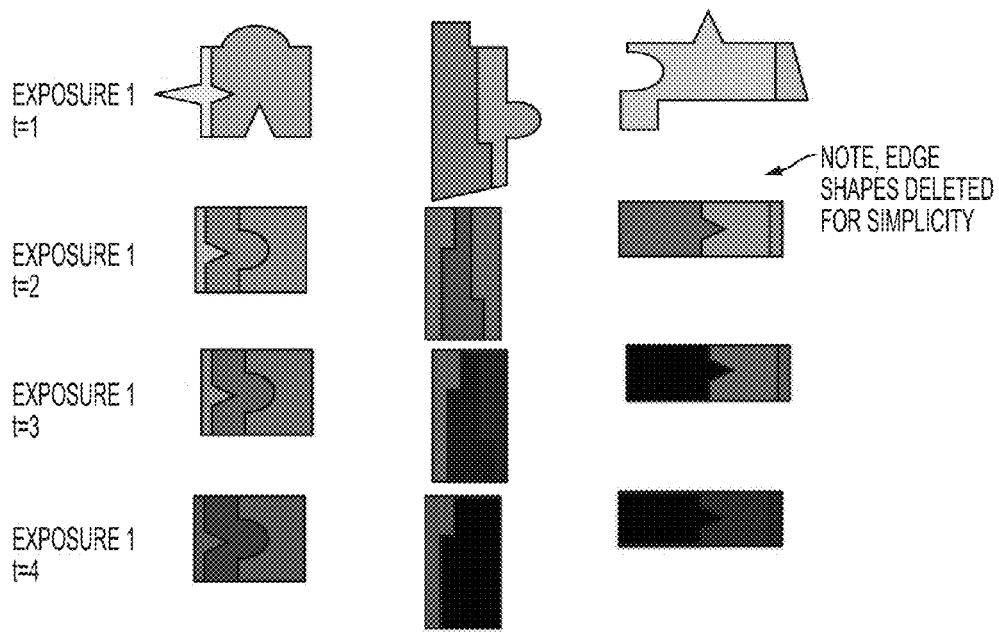
Figure 14:
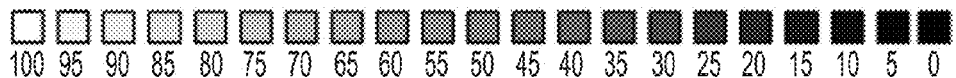
FIG. 14 depicts a diagram and a table for identifying 4 of the 22 different types of data from FIG. 10 to be encoded in a pixel according to an embodiment.
Figure 14:
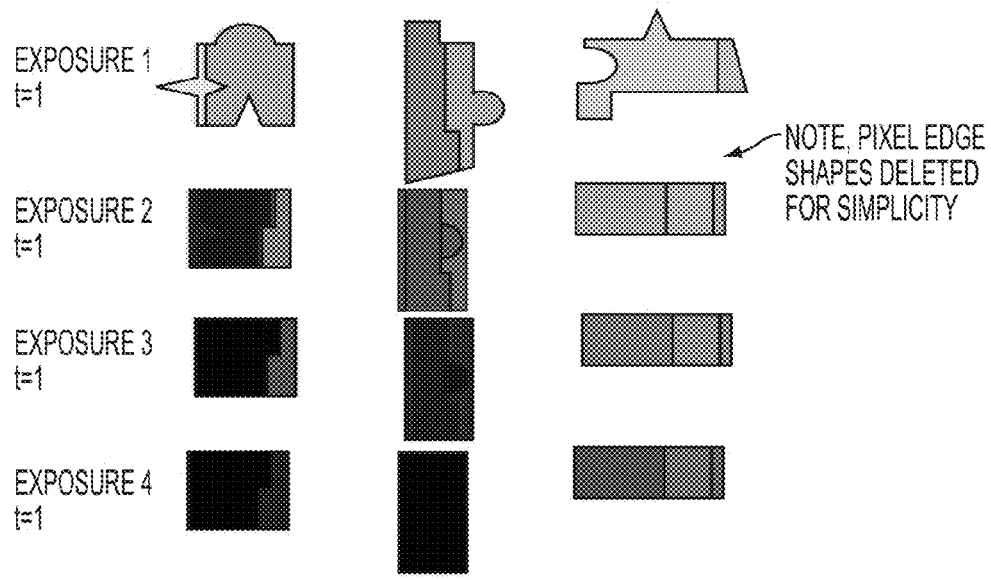

FIG. 10 depicts an example of a reference table for each of 22 unique dimensions of a pixel, as well as a corresponding encoding for 9 bits of information in each dimension (A, B, C, D, 1, 2, 3, 4, and). Each dimension is encoded into the pixel so as to be completely independent of another. Thus, a different type of data may be encoded into each dimension. Some of the information in each dimension may be readable through the use of shape and color recognition under normal lighting conditions (see FIG. 11). Some of the dimensions may require the pixel to be illuminated, such as with a strong flash, and then the intensity of the phosphor is measured at different time points, as depicted in FIGS. 12 and 13. Some of the information is encoded such that the pixel needs to be illuminated multiple times, and the intensity of the phosphor is read subsequent to each illumination and thus compared to measure the amount of photobleaching, as depicted in FIG. 14.

Figure 11:
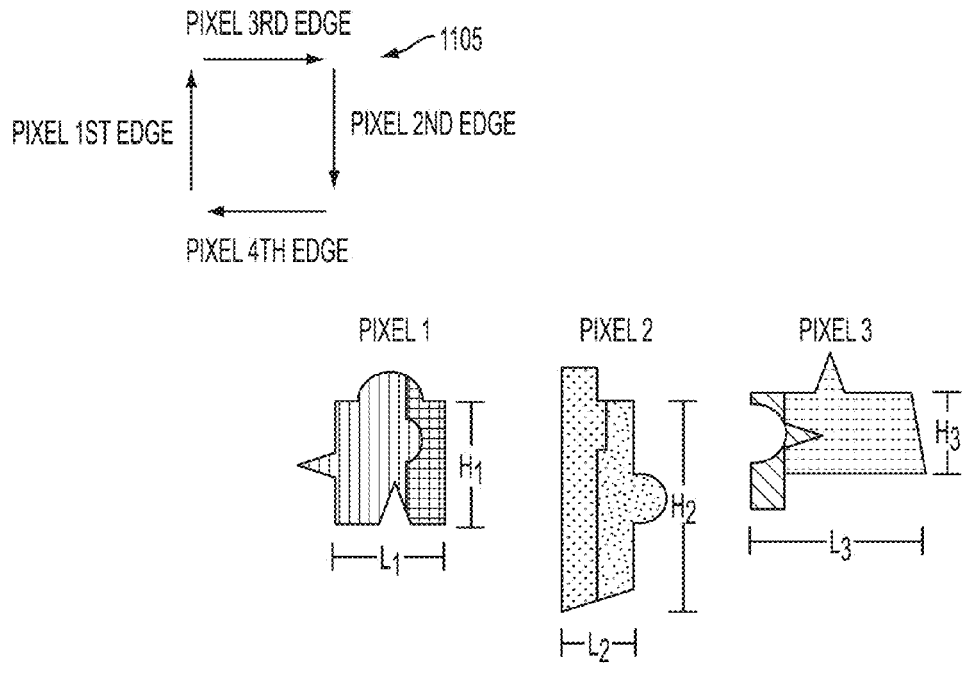
FIG. 11 depicts a diagram and a table for identifying 10 of the 22 different types of data from FIG. 10 to be encoded in a pixel according to an embodiment.

FIG. 11 depicts three individual pixels that contain coding for ten (10) unique dimensions of information that can be deciphered by image processing under normal light conditions. This deciphering can be accomplished with standard digital imaging and image processing algorithms for edge detection, distance measurement, shape recognition, color recognition and light intensity. FIG. 11 also provides an orientation guide 1105 that shows four (4) edges of a pixel, wherein the left side edge is the first edge, the right side edge is the second edge, the upper edge is the third edge and the bottom edge is the fourth edge. Thus, in Pixel 1, the first edge is a triangle. The reference table provided in FIG. 10 indicates that when the first edge is a triangle, it corresponds to encoding for the number "3". Referring back to FIG. 11, Pixel 2 has a first edge that is straight, which corresponds to encoding for the letter "A" in the reference table shown in FIG. 10. Pixel 3 has a first edge that is an inverted semicircle, which corresponds to encoding for the number "4". Thus, the code for a first dimension that encompasses the first edge of all three pixels is "3A4".

Moving on to the second (i.e., right side) edge for each of the three pixels, it is evident that Pixel 1 has a straight edge, Pixel 2 has a semicircle and Pixel 3 has an angled straight edge. Referring to the reference table in FIG. 10, the encoded characters that correspond to the three edges are "0.4D". This process may then be repeated for the third (i.e., upper) and fourth (i.e., lower) edges to obtain the respective encoding, which is shown in the first four rows of the table depicted in FIG. 11.

The respective lengths $L_1$, $L_2$ and $L_3$ of Pixel 1, Pixel 2 and Pixel 3 may be measured from the first edge to the second edge without factoring the shapes of either edge to provide encoding for a fifth dimension. Thus, as shown in the table in FIG. 11, the code "2D4" corresponds to the respective lengths of $L_1$, $L_2$ and $L_3$.

Similarly, the respective heights $H_1$, $H_2$ and $H_3$ of Pixel 1, Pixel 2 and Pixel 3 may be measured from the third edge to the fourth edge without factoring the shapes of either edge to provide encoding for a sixth dimension. Thus, as shown in the table in FIG. 11, the code "8.D" corresponds to the respective heights of $H_1$, $H_2$ and $H_3$.

Encoding for a seventh and eighth dimension may be obtained via the color of the first and second edges, respectively, of each of Pixel 1, Pixel 2 and Pixel 3. The color may be determined by software and compared to a color chart, such as the one provided in FIG. 10 to obtain the encoding for each color. For example, the encoding for the first edges provides the code "ABC" and the encoding for the second edges provides the code "C3A".

A ninth dimension may be encoded from a relative portion of the pixel that is colored by the first edge color compared to a relative portion of the pixel that is colored by the second edge color, such as, for example, the color gradient. As shown in FIG. 11, 60 percent of Pixel 1 is colored with the first edge color and 40 percent of Pixel 1 is colored with the second edge color, which corresponds to an encoding of "D" in the reference table of FIG. 10. Pixel 2 is evenly colored at 50% of the first edge color and 50% of the second edge color, which corresponds to an encoding of "1" in the reference table of FIG. 10. Pixel 3 is 20% colored by the first edge color and 80% colored by the second edge color, which corresponds to an encoding of "4" in the reference table of FIG. 10. Thus, the ninth dimension of encoding contains the code "D14".

A tenth dimension may be encoded from a shape created by the intersection of each of the two colors in each pixel. Thus, Pixel 1 contains an intersection in the shape of a semicircle, which, as shown in the table in FIG. 10, corresponds to the number "4". Accordingly, Pixel 2 contains an intersection in the shape of a step, which, as shown in the table in FIG. 10, corresponds to the letter "B". Finally, Pixel 3 contains an intersection in the shape of a triangle, which, as shown in the table in FIG. 10, corresponds to the letter "C". Thus, the tenth dimension of encoding contains the code "4BC".

FIG. 12 depicts the use of a luminescent ink over Pixel 1, Pixel 2 and Pixel 3. When each of the three pixels are illuminated (i.e., with a light, a smartphone flash, etc.) and then measured for intensity at a particular point in time thereafter (t=1), encoding for additional dimensions is possible. In this example, the intensity of the luminescent ink at the first edge and second edge are used to encode the 11th and 12th dimensions, respectively. The intensity can be varied by changing the amount or the type of luminescent ink, or by including different dopants. The intensity may be determined as an absolute or a relative, such as by use of reference points. While intensity is shown in FIG. 12 as ranging from black to white, it is to be understood that the intensity is separate and distinct from the colors previously discussed. In some instances, software may be used to correct the color in order to correctly determine each luminescence property.

Similar to the color, the two edge phosphors can be arranged in combinations such as shown here. The code for the 13th dimension is determined by the relative amounts of the first and second phosphor intensity across each pixel. Also, a shape included at the interface between the two phosphors.

As depicted in FIG. 13, the rate of phosphorescence decay over time after a single exposure may be controlled using dopants or different compositions of the phosphor. Thus, additional dimensions may be encoded by measuring the intensity of light emitted from each pixel after the first illumination at different time points (e.g., t=1, 2, 3 and 4). The measurements may then be used to determine the decay rates of each pixel. In this example, the decay rate of the first edge of Pixel 1 is 20 (i.e., 20% of the intensity of the phosphor is diminished after each time point). This decay rate corresponds to "B" in the reference table of FIG. 10. The decay rate for the first edge of Pixels 2 and 3 are 10 and 50, respectively, which correspond to "A" and "1" in the reference table of FIG. 10.

The gradient of the decay rate (i.e., the percentage of the phosphor with the decay rate at the first edge compared to that at the second edge), may provide a seventeenth dimension for the pixels. This may be similar in the manner in which the ninth dimension is obtained for color. Thus, Pixel 1 exhibits a 40% first decay rate and a 60% second decay rate, which corresponds to a code of "2".

Similar to the encoding of the tenth dimension, a shape that is defined by the intersection of each phosphor on each pixel decaying at different rates may be encoded as an eighteenth dimension. Thus, the semicircular shape defined by the phosphors on Pixel 1 corresponds to a code of "B".

FIG. 14 depicts another group of dimensions that may be encoded from the same Pixel 1, Pixel 2 and Pixel 3. These dimensions may generally be determined from multiple exposures. Phosphors are known to photobleach, and the photobleaching may be manipulated to vary. Thus, by exposing the pixels to multiple illuminations (e.g., flashes) and measuring intensities at the same time point (t=1) after each exposure, the photobleaching can be determined. In the present example, Pixel 1, Pixel 2 and Pixel 3 are exposed to 4 exposures, and the intensities are determined after each exposure to encode the remaining dimensions. For example, the first edge of Pixel 1 photobleaches at a rate of 80% (i.e., the intensity of the phosphor is diminished by 80% after each exposure), which corresponds to "B" in the reference table presented in FIG. 10. The intensity of the first edge of the Pixel 2 diminishes by 30% with each exposure, which corresponds to "3" in the reference table presented in FIG. 10.

The photobleaching gradients of each pixel may be used to encode the $21^{st}$ dimension in a manner similar to the ninth dimension. Likewise, the shape created by the intersection of the two photobleaching gradients may be used to encode the $22^{nd}$ dimension in a manner similar to the tenth dimension.

While only 22 dimensions are depicted in the previous example, those skilled in the art will recognize that additional dimensions may be possible without departing from the scope of the present disclosure. Furthermore, each dimension may code more than 9 bits of information by including additional shapes, locations of shapes, dimensions, colors, gradients, luminescent properties, photobleaching properties and the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A symbology to encode data, wherein the symbology comprises a plurality of pixels arranged in a plurality of patterns on a substrate, wherein each of the plurality of pixels comprises a plurality of portions, each portion comprising one or more of a plurality of luminescent colorants, wherein each of the plurality of luminescent colorants has a corresponding luminance that decays, in response to an excitation event, according to a decay rate such that, as the corresponding luminance decays, optical properties associated with each of the plurality of portions comprising the corresponding luminance are changed, which alters encoded data contained within at least one portion of the symbology, thereby providing one or more types of non-interacting data encoded within the symbology.

2. The symbology of claim 1, wherein each portion further comprises a plurality of optical properties selected from a group comprising a color property, a shape property, a dimensional property, a relational property, an intensity property, a photobleaching property, a fluorescence property, a fluorescence resonance energy transfer property, and a gradient property.

3. The symbology of claim 2, wherein each of the plurality of optical properties provides one or more additional types of non-interacting data.

4. The symbology of claim 1, wherein each portion further comprises a shape that provides a first type of non-interacting data and a plurality of dimensions that provides a second type of non-interacting data.

5. The symbology of claim 1, wherein an intersection of a first luminescent colorant with a second luminescent colorant provides one or more types of non-interacting data.

6. The symbology of claim 5, wherein the intersection comprises one or more of a gradient and a shape.

7. The symbology of claim 1, wherein each of the one or more luminescent colorants comprises one or more of a fluorescent colorant and a phosphorescent colorant.

8. The symbology of claim 1, wherein at least one of the one or more luminescent colorants is a phosphorescent colorant having a phosphorescence that diminishes over a period of time.

9. The symbology of claim 8, wherein the phosphorescence provides at least one additional type of non-interacting data.

10. The symbology of claim 1, wherein at least one of the one or more luminescent colorants is a phosphorescent colorant having a phosphorescence that diminishes after repeated illumination.

11. The symbology of claim 10, wherein the phosphorescence provides at least one additional type of non-interacting data.

12. The symbology of claim 1, wherein the one or more types of non-interacting data each provide positioning information for the symbology.

13. A method to encode a symbology, the method comprising arranging a plurality of pixels on a substrate in a plurality of patterns to form a machine-readable code, wherein each of the plurality of pixels comprises a plurality of portions, each portion comprising one or more of a plurality of luminescent colorants, wherein each of the plurality of luminescent colorants has a corresponding luminance that decays, in response to an excitation event, according to a decay rate such that, as the corresponding luminance decays, optical properties associated with each of the plurality of portions comprising the corresponding luminance are changed, which alters encoded data contained within at least one portion of the symbology, thereby providing one or more types of non-interacting data encoded within the symbology.

14. The method of claim 13, wherein arranging the plurality of pixels comprises arranging the plurality of pixels such that each portion further comprises a shape that provides a first type of non-interacting data and a plurality of dimensions that provides a second type of non-interacting data.

15. The method of claim 13, wherein arranging the plurality of pixels comprises arranging the plurality of pixels such that an intersection of a first luminescent colorant with a second luminescent colorant provides one or more types of non-interacting data.

16. The method of claim 15, wherein arranging the plurality of pixels comprises arranging the plurality of pixels such that the intersection comprises one or more of a gradient and a shape.

17. The method of claim 13, wherein arranging the plurality of pixels comprises arranging the plurality of pixels such that each of the one or more luminescent colorants comprises one or more of a fluorescent colorant and a phosphorescent colorant.

18. The method of claim 13, wherein arranging the plurality of pixels comprises arranging the plurality of pixels such that at least one of the one or more luminescent colorants is a phosphorescent colorant having a phosphorescence that diminishes over a period of time.

19. The method of claim 13, wherein arranging the plurality of pixels comprises arranging the plurality of pixels such that at least one of the one or more luminescent colorants is a phosphorescent colorant having a phosphorescence that diminishes after repeated illumination.

20. The method of claim 13, wherein arranging the plurality of pixels comprises arranging the plurality of pixels such that the one or more types of non-interacting data each provide positioning information for the symbology.

21. A method to decode a symbology comprising a plurality of pixels having a plurality of portions, the method comprising:
    reading a shape of each portion of the plurality of pixels by an optical reading apparatus to obtain one or more first types of non-interacting data;
    reading a size of each portion of the plurality of pixels by the optical reading apparatus to obtain one or more second types of non-interacting data;
    reading one or more optical properties of each portion of the plurality of pixels by the optical reading apparatus to obtain one or more third types of non-interacting data;
    determining a luminance of each portion of the plurality of pixels by the optical reading apparatus to obtain one or more fourth types of non-interacting data, wherein the luminance decays, in response to an excitation event, over a period of time, such that, as the luminance decays, optical properties associated with each of the plurality of portions comprising the luminance are changed, which alters encoded data contained within at least one portion of the symbology, thereby providing non-interacting data encoded within the symbology;
    combining the first types of non-interacting data, the second types of non-interacting data, the third types of non-interacting data, and the fourth types of non-interacting data by a processing device; and
    decoding the combination by the processing device.

22. A method to decode a symbology comprising a plurality of pixels having a plurality of portions, the method comprising:
    reading a shape and a size of each portion of the plurality of pixels by an optical reading apparatus to obtain one or more first types of non-interacting data;
    reading one or more optical properties of each portion of the plurality of pixels by the optical reading apparatus to obtain one or more second types of non-interacting data;
    determining a luminance of each portion of the plurality of pixels by the optical reading apparatus to obtain one or more third types of non-interacting data, wherein the luminance decays, in response to an excitation event, over a period of time such that, as the luminance decays, optical properties associated with each of the plurality of portions comprising the luminance are changed, which alters encoded data contained within at least one portion of the symbology, thereby providing non-interacting data encoded within the symbology;
    combining the first types of non-interacting data, the second types of non-interacting data, and the third types of non-interacting data by a processing device; and
    decoding the combination by the processing device.

23. An article of manufacture comprising a symbology to encode data, wherein the symbology comprises a plurality of pixels arranged in a plurality of patterns on a substrate, wherein each of the plurality of pixels comprises a plurality of portions, each portion comprising one or more of a plurality of luminescent colorants, wherein each of the plurality of luminescent colorants has a corresponding luminance that decays, in response to an excitation event, according to a decay rate such that, as the corresponding luminance decays, optical properties associated with each of the plurality of portions comprising the corresponding luminance are changed, which alters encoded data contained within at least one portion of the symbology, thereby providing one or more types of non-interacting data encoded within the symbology.

24. The article of manufacture of claim 23, wherein the article of manufacture is selected from a group comprising apparel, computer components, storage devices, sanitation components, automobiles, chemicals, foods, beverages and paper products.

* * * * *

UNITED STATES PATENT AND TRADEMARK OFFICE
CERTIFICATE OF CORRECTION

PATENT NO. : 9,269,034 B2  
APPLICATION NO. : 13/816574  
DATED : February 23, 2016  
INVENTOR(S) : Manion et al.

Page 1 of 1

It is certified that error appears in the above-identified patent and that said Letters Patent is hereby corrected as shown below:

In the Specification

In Column 1, Line 7, delete "§371" and insert -- § 371 --, therefor.

In Column 13, Line 46, delete "at least one and one or more" and insert -- "at least one" and "one or more" --, therefor.

In Column 13, Line 49, delete "or an" and insert -- or "an" --, therefor.

In Column 13, Line 53, delete "one or more and at least one" and insert -- "one or more" and "at least one" --, therefor.

In Column 13, Line 54, delete "or an" and insert -- or "an" --, therefor.

Signed and Sealed this  
Twenty-sixth Day of July, 2016

Michelle K. Lee  
*Director of the United States Patent and Trademark Office*